Feb. 22, 1949.          G. W. NAGEL ET AL          2,462,213
                        PHASE ANGLE METER
                      Filed Oct. 12, 1946
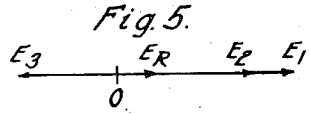
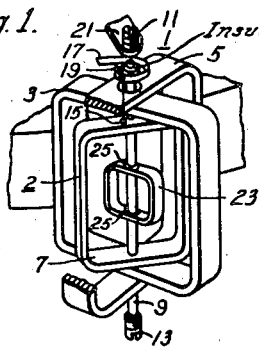
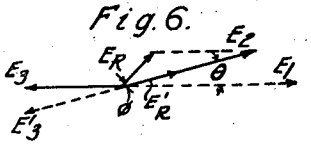
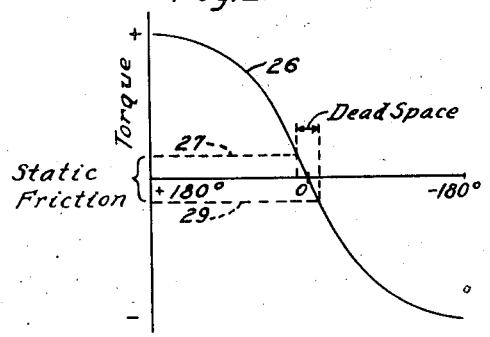
Angular Displacement of
Moving Coil From Rest Position.
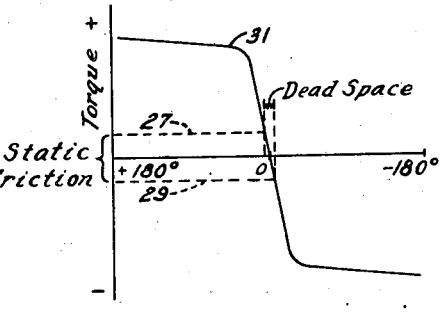
Angular Displacement of
Moving Coil From Rest Position.
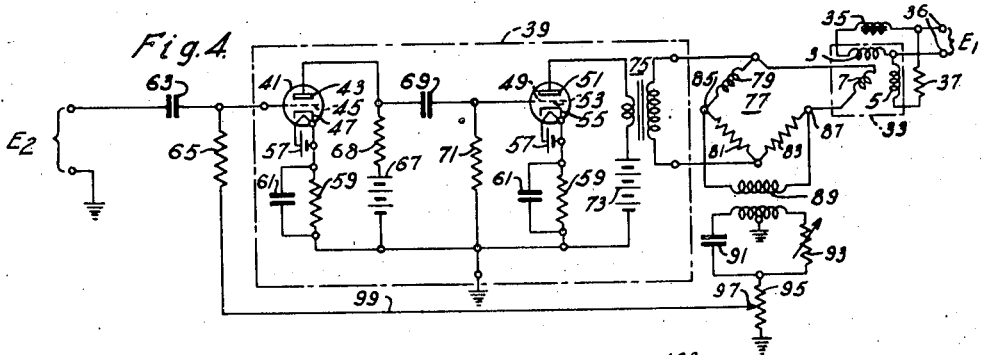
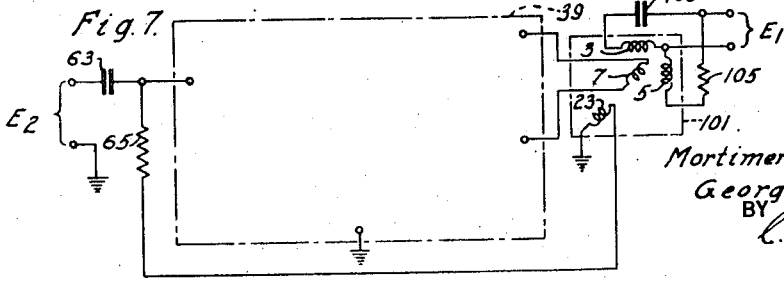
INVENTORS
Mortimer A. Schultz and
George W. Nagel.
BY
ATTORNEY Patented Feb. 22, 1949

2,462,213

UNITED STATES PATENT OFFICE 2,462,213

PHASE ANGLE METER

George W. Nagel and Mortimer A. Schultz, Baltimore, Md., assignors to Westinghouse Electric Corporation, East Pittsburgh, Pa., a corporation of Pennsylvania Application October 12, 1946, Serial No. 703,058

10 Claims. (Cl. 172—245)

This invention relates to devices responsive to the phase displacement between a plurality of alternating quantities, and it has particular relation to measuring instruments for measuring the phase angle between a pair of alternating electrical quantities.

Devices responsive to the phase displacement between a plurality of alternating quantities are widely employed. In typical devices of this type, a stator assembly may be employed together with a rotor assembly which is mounted for rotation with respect to the stator assembly. One of these assemblies includes a polyphase coil assembly for producing a rotating magnetic field. Such a field may be produced by mounting two coils at right angles to each other and energizing these coils by electrical currents which differ in phase by 90°. The other assembly includes a single-phase coil which is disposed in the rotating magnetic field. When the device is employed for measuring power factor, it is common practice to provide the single-phase coil assembly on the stator assembly and to mount the polyphase coil assembly for rotation with respect to the stator assembly. Power factor meters embodying such a construction are illustrated and discussed in various books on electrical measuring instruments. See, for example, "Electrical Measurements" by F. A. Laws, 1917 edition, pp. 532 to 535, published by McGraw-Hill Book Company, New York city. If the device is to be employed for measuring the phase angle between a pair of alternating electrical voltages, the coil assembly for producing a rotating magnetic field may be included in the stator assembly and the single-phase coil assembly may be mounted for rotation with respect to this stator assembly.

When a phase angle measuring device of the foregoing type has a rotor and stator assembly energized respectively in accordance with two alternating voltages, the rotor assembly is urged towards a correct or rest position relative to the stator assembly wherein the resultant torque applied to the rotor assembly is equal to zero. This correct position varies in accordance with the magnitude of the phase displacement between the two alternating voltages. As the rotor assembly approaches its correct position, the resultant torque acting thereon decreases until it has a value which is insufficient to overcome the static friction of the device. This static friction includes the friction of the bearings employed for the rotor assembly and the friction of the brushes and slip rings, or the flexible ligaments which are employed to conduct current to the rotor assembly. Because of the static friction the rotor assembly may occupy an angular position on either side of its correct position, wherein the resultant torque applied to the rotor assembly is insufficient to overcome static friction. In some conventional phase angle meters, the position in which the rotor assembly comes to rest may vary over an angular range or dead space of 4°. An error of this magnitude is objectionable in many applications of devices responsive to phase displacement of alternating quantities.

The torque developed between each coil of the polyphase coil assembly and the single-phase coil is dependent on the magnitudes of the electrical currents traversing the coils, on the angular mechanical displacement of the coils, and on the electrical phase displacement between the currents traversing the coils. (For a fuller mathematical analysis of the torque see the aforesaid book by Laws.) It is possible to increase the torque acting on the rotor assembly by increasing the currents supplied by the coils and this would tend to decrease the error of the device. However, an increase in current is restricted by the heat dissipating properties of the coils of the device.

In accordance with the invention, the torque developed between each coil of the polyphase coil assembly and the single-phase coil is modified by distorting or shifting the phase displacement between electrical currents traversing the coils when the rotor assembly is displaced slightly from its correct position. By suitable control of this phase displacement, the resultant torque acting on the rotor assembly in the region adjacent the correct position thereof may be increased appreciably without increasing the magnitudes of the currents traversing the coils. This facilitates a substantial reduction in the dead space or error of the device. It has been found possible to reduce this dead space from an angular range of 4° to less than 1° of mechanical rotation in one commercial form of this device.

The desired control of the phase displacement may be effected by adding to one of the assemblies, such as the single-phase coil assembly an auxiliary alternating current having a phase relative to the alternating quantity energizing the polyphase coil assembly which is dependent on the position of the rotor assembly with respect to stator assembly.

It is therefore an object of the invention to provide an improved device which is responsive to the phase displacement between two alternating quantities.

It is a further object of the invention to provide a device responsive to the phase displacement between a pair of alternating quantities wherein errors resulting from static friction are minimized.

It is another object of the invention to provide a device responsive to the phase displacement between two alternating quantities wherein a pair of relatively rotatable coil assemblies are disposed for energization respectively by the alternating quantities, and wherein the energization of one of the coil assemblies by a first one of the alternating quantities is augmented by an auxiliary energization which bears a phase relationship to a second one of the alternating quantities dependent on the relative positions of the coil assemblies.

Other objects of the invention will be apparent from the following description taken in conjunction with the accompanying drawing, in which:

Figure 1 is a view in perspective with parts broken away of a device responsive to the phase displacement between a plurality of alternating quantities.

Fig. 2 is a graphical representation showing torque characteristics of a prior art device which is responsive to the phase displacement between a pair of alternating quantities.

Fig. 3 is a graphical representation showing torque characteristics of a device embodying the invention.

Fig. 4 is a diagrammatic view of a system responsive to the phase displacement between a pair of alternating quantities which embodies the invention.

Figs. 5 and 6 are vector diagrams showing phase conditions present in the system of Fig. 4 under conditions of operation, and Fig. 7 is a diagrammatic view of a system embodying a modified form of the invention.

Referring to the drawing, Fig. 1 shows a device which is responsive to the phase displacement between a pair of alternating electrical quantities. This device includes a stator or polyphase coil assembly 1 and a rotor or single-phase coil assembly 2. The stator assembly includes a pair of coils 3 and 5 which are disposed at right angles to each other. When these coils are energized respectively by electrical currents displaced in phase by 90°, a rotating magnetic field is produced thereby. The rotor assembly 2 includes a coil 7 arranged for energization by a single-phase alternating quantity and mounted on a shaft 9 for rotation in the aforesaid rotating magnetic field. The shaft 9 may be positioned for rotation in suitable bearings 11 and 13. Since the coil 7 is disposed for rotation with respect to the stator assembly, connections thereto are effected through conductors which do not interfere with the desired rotation. For example, one terminal 15 of the coil 7, together with the shaft 9, pass through openings in the coils 3 and 5, and the terminal 15 is connected to the inner end of a flexible, spiral conductor strip or ligament 17. The inner end of the ligament 17 is attached to an insulating bushing 19 which in turn is attached to the shaft 9. The outer end of the ligament 17 may be connected to any desired electrical circuit. It will be understood that a separate ligament is provided for each of the terminals of the coil 7.

The rotor assembly 2 also is provided with a pointer 21 which is disposed for rotation adjacent a scale (not shown). The pointer indicates the angular position of the coil 7 with respect to the stator assembly, and if the device is to be employed for measuring phase displacement, the scale may be calibrated in terms of such phase displacement. The structure of Fig. 1 thus far described specifically is well known in the art. When the coils 3 and 5 are energized in accordance with a first alternating quantity and the coil 7 is energized in accordance with a second alternating quantity, the coil 7 is urged toward a position which corresponds to the phase displacement between the alternating quantities. If the coils 3 and 5 are energized from a single-phase alternating quantity, they may be energized through a suitable phase splitter for providing the desired rotating magnetic field. Suitable circuit connections will be discussed below.

Fig. 1 also shows a coil 23 which is mounted on the shaft 9. Ligaments similar to the ligaments 17 may be employed for connecting the coil 23 to an external circuit. For purposes hereinafter set forth, the coil 23 is so mounted that it normally rotates with the shaft 9 but may be manually displaced about the shaft. For example, the coil 23 may be positioned on the shaft 9 by means of collars 25 which are secured to the coil. These collars frictionally engage the shaft for rotation therewith, but permit manual rotation of the coil 23 about the shaft 9 for purposes of adjustment.

When the coils 3 and 5 are energized from a first alternating quantity and the coil 7 is energized from a second alternating quantity in accordance with prior art practice, a torque characteristic curve 26 is obtained which is similar to that shown in Fig. 2. In Fig. 2 abscissae represent the angular displacement of the coil 7 from the correct or rest position (0°) which the coil should occupy to denote the phase displacement between the two alternating quantities. Ordinates represent the torque applied to the coil 7. It will be noted that when the coil 7 is displaced from its correct position (0°) in either direction, a torque is developed which urges the coil towards the correct position. The torque decreases as the coil approaches its correct position and becomes zero when the coil is correctly positioned.

In the device of Fig. 1 a substantial amount of static friction is present. This includes the friction of the bearings 11 and 13 and the friction introduced by the ligaments 17. The static friction is represented in Fig. 2 by dotted lines 27 and 29. The portion of the curve 26 which falls between the lines 27 and 29 represents torques which are too small in magnitude to overcome the static friction of the device. The horizontal distance which corresponds to this portion of the curve 26 indicates the extent of error of the device and is labeled "dead space" in Fig. 2. In a conventional instrument, this dead space may cover an angular movement of the coil 7 of the order of 4°.

In accordance with the invention, a characteristic curve is provided which is similar to the curve 31 of Fig. 3. In Fig. 3, ordinates and abscissae are similar to those employed for Fig. 2. It will be noted in Fig. 3 that the slope of the curve 31 as it passes through the correct or "rest" position (0°) of the moving coil is substantially greater than the slope of the corresponding portion of the curve 26. Consequently, the dead space represented by the curve 31 is materially less than that represented by the curve 26 of Fig. 2. As previously pointed out, it is possible by following the teachings of the invention to reduce the dead space to less than 1° of angular movement of the coil 7.

A system which is responsive to the phase displacement between two alternating electrical quantities and which has a characteristic similar to that of Fig. 3 is illustrated in Fig. 4. Referring to Fig. 4, a device 33 is provided which corresponds to the device of Fig. 1 except for the omission of the coil 23. The coils 3 and 5 in Fig. 4 are connected for energization through a suitable phase splitter in accordance with an alternating electrical voltage $E_1$. The phase splitter may be of any desired construction. For the purpose of illustration, the phase splitter in Fig. 4 is represented by an inductance coil 35 which is connected in series with the coil 3 across the terminals 36 to which the voltage $E_1$ is to be applied, and by a resistor 37 which is connected in series with the coil 5 across the terminals 36. If the resistor 37 has a value of resistance which is large compared to the inductive reactance of the coil 5, the current passing through the coil 5 is substantially in phase with the voltage $E_1$. On the other hand, the current passing through the coil 3 lags the voltage $E_1$ by substantially 90°. Consequently, when the voltage $E_1$ is applied to the terminals 36, the coils 3 and 5 set up a rotating field within which the coil 7 is mounted for rotation.

If the available energy is small, amplifiers may be employed for energizing the coils of the device. In Fig. 4, the coil 7 is disposed for energization from an amplifier 39 which has an input voltage $E_2$ applied thereto. The amplifier 39 may be of any conventional construction providing it has substantially zero phase shift at the frequency of the voltages to be measured. For the purpose of illustration, the amplifier includes an electronic amplifier tube 41 which has a plate 43, a grid 45 and a cathode 47. A second amplifier tube 49 is provided which includes a plate 51, a grid 53, and a cathode 55. The cathodes 47 and 55 may be energized from any suitable sources which here are represented by batteries 57. For the purpose of providing self-bias for the tubes 41 and 49, the cathodes of these tubes are connected to ground through biasing resistors 59 and capacitors 61 in a conventional manner. The voltage $E_2$ is applied through a coupling capacitor 63 across a grid resistor 65 and a portion of a resistor 95. The grid resistor 65 has one terminal connected to the grid 45, and a second terminal connected through a conductor 99, the resistor 95, ground and the biasing resistor 59 to the cathode 47. Plate voltage for the tube 41 is supplied in any desired manner as by a battery 67 which has its positive terminal connected through a plate resistor 68 to the plate 43. The tube 41 is coupled to the tube 49 through a coupling capacitor 69 and a grid resistor 71. Plate voltage for the tube 49 is supplied by a battery 73 which has its positive terminal connected through the primary winding of an output transformer 75 to the plate 51.

The secondary winding of the output transformer 75 is connected to the coil 7 through a balanced Wheatstone bridge 77. The coil 7 is disposed in one arm of the Wheatstone bridge and a similar coil 79 may be provided in a second arm of the bridge. Two identical resistors 81 and 83 may be employed in the remaining arms of the bridge. The input terminals of the bridge are connected to the terminals of the secondary winding of the output transformer 75. Consequently, the coil 7 is energized in accordance with the output of the amplifier 39. However, since the bridge 77 is a balanced bridge, a voltage across the secondary winding of the transformer 75 does not produce a voltage across the output terminals 85, 87 of the bridge.

If the system thus far specifically described with reference to Fig. 4 were to be employed, a characteristic curve would be obtained which is similar to the curve shown in Fig. 2. In order to obtain a characteristic curve similar to that shown in Fig. 3, auxiliary energy is supplied to the coil 7 which has a phase relative to the voltage $E_1$ dependent on the position of the coil 7 with respect to the coils 3 and 5. Since the coil 7 is disposed in a rotating magnetic field, a voltage is induced in this coil which has a phase relative to the voltage $E_1$ dependent on the position of the coil with respect to the associated coils 3 and 5. Consequently, this induced voltage may be employed for producing the desired characteristic curve. The voltage induced in the coil 7 appears across the output terminals 85 and 87 of the bridge, and these output terminals are connected to the primary winding of a transformer 89.

Although the output of the transformer 89 may be applied directly to the input of the amplifier 39, it is generally desirable to provide mechanism for adjusting the phase of the auxiliary voltage supplied to the input of the amplifier with respect to the voltage induced in the coil 7. For this purpose the terminals of the secondary winding of the transformer 89 are connected respectively through a capacitor 91 and an adjustable resistor 93 to one terminal of the resistor 95. The remaining terminal of the resistor 95 is connected through ground to a center tap on the secondary winding of the transformer 89. By adjusting the resistor 93 the phase of the voltage across the resistor 95 may be varied with respect to the voltage induced in the coil 7. The resistor 95 also is provided with an adjustable tap 97. An adjustable portion of the voltage drop across the resistor 95 is applied to the input of the amplifier 39 through the conductor 99, resistor 65, and ground. The operation of the system illustrated in Fig. 4 may be considered with particular reference to the vector diagrams of Figs. 5 and 6. Let it be assumed that the voltages $E_1$ and $E_2$ are in phase. The coil 7 is then urged towards a correct or rest position wherein the plane of the coil 7 is parallel to the plane of the coil 5. Under these conditions, a vector diagram similar to that of Fig. 5 may be obtained. In Fig. 5 the voltages $E_1$ and $E_2$ are in phase. The adjustment of the resistor 93 is such that the auxiliary voltage $E_3$ supplied to the amplifier 39 by the conductor 99, resistor 65 and ground is in phase opposition to the voltage $E_1$. The resultant input voltage $E_R$ to the amplifier 39 is the vector sum of the voltage $E_2$ and $E_3$ and is shown in Fig. 5. This voltage $E_R$ is amplified and supplied to the coil 7.

With the parts in the positions described in the preceding paragraph, let it be assumed that the input voltage $E_2$ changes in phase relative to the voltage $E_1$ by an angle $\theta$. If the auxiliary voltage $E_3$ were not provided, the torque applied to the coil 7 would be a function of the angle $\theta$ and would have a relatively small value. However, as shown in Fig. 6, the auxiliary voltage $E_3$ adds vectorially to the voltage $E_2$ to provide the resultant voltage $E_R$ which is displaced in phase from the voltage $E_1$ by a large angle $\phi$. Since the voltage $E_R$ in Fig. 6 is displaced from the voltage $E_1$ by a large angle $\phi$, the torque applied to the coil 7 is much greater than the torque which would be available if the voltage $E_R$ were displaced in phase by the relatively small angle $\theta$ from the voltage $E_1$. Under the influence of this substantial torque, the coil 7 moves to a new position which corresponds to the phase displacement between the voltages $E_1$ and $E_2$. As the coil 7 moves from a position parallel to the coil 5 to its new position, the voltage induced therein changes in phase with respect to the voltage of $E_1$. Consequently, the voltage $E_3$ rotates to a new position $E_3'$ which is in phase opposition relative to the voltage $E_2$ when the coil 7 is in its new correct or rest position. The vector sum of the voltage $E_2$ and the auxiliary voltage $E_3'$ gives a resultant voltage $E_R'$ which is in phase with the voltage $E_2$. Therefore, the coil 7 takes a position which corresponds accurately to the phase displacement between the voltages $E_1$ and $E_2$. From a consideration of Figs. 5 and 6, it will be seen that the effect of the auxiliary voltage $E_3$ is to increase the slope of the characteristic torque curve adjacent to the correct or rest position of the movable coil 7 in the manner illustrated in Fig. 3. As previously explained, by following the teachings of the invention it has been found possible to reduce the dead space of the phase responsive device to less than 1°.

If desired, an auxiliary pickup coil may be connected to the coil 7 for rotation therewith, and this auxiliary coil may be located in a rotating magnetic field similar to the magnetic field produced by the energization of the coils 3 and 5. The auxiliary coil then may be employed for supplying the auxiliary voltage $E_3$ to the input of the amplifier 39. A system embodying this modification is illustrated in Fig. 7.

Referring to Fig. 7, a device 101 is disclosed which may be identical to the device shown in Fig. 1. The coils 3 and 5 again are energized in accordance with the voltage $E_1$ through a suitable phase splitter. In the case of Fig. 7, the phase splitter is illustrated as including a capacitor 103 and a resistor 105. Because of the presence of the capacitor 103, a current flows through the coil 3 which leads the voltage $E_1$. By properly proportioning the inductance of the coil 5 and the resistance value of the resistor 105, a current flows through the coil 5 which lags the voltage $E_1$ by an amount sufficient to bring the currents flowing through the coils 3 and 5 into quadrature. It should be understood that the calibration of the instrument 101 may be modified, depending on the specific type of phase splitter employed.

In Fig. 7, the coil 7 is energized directly from the output terminals of the amplifier 39. The auxiliary coil 23 is connected in series with the grid resistor 65. Consequently, the voltage applied to the amplifier 39 is equal to the vector sum of the voltage $E_2$ and the voltage induced in the pickup coil 23. The phase of the voltage induced in the pickup coil 23 may be varied with respect to the voltage $E_1$ by rotating the coil 23 as desired about its shaft 9. Consequently, no additional phase adjusting mechanism is required for the system illustrated in Fig. 7. It is believed that the operation of the modification illustrated in Fig. 7 will be apparent from the discussion of the operation of the system illustrated in Fig. 4.

By proper spacing or other procedures well understood in the art, the coupling between the coils 7 and 23 preferably is kept low in order to avoid cross-pickup between the coils. If desired, the coil 23 could be located in space quadrature relative to the coil 7 to eliminate cross-pickup and the output of coil 23 may be passed through a conventional variable phase shifter to obtain the necessary phase adjustment.

Although the invention has been discussed with reference to various specific embodiments thereof, numerous modifications are possible. Therefore, the invention is to be restricted only by the appended claims as interpreted in view of the prior art.

We claim as our invention:

1. In a device responsive to the phase displacement between two alternating electrical quantities, means effective when energized by a first alternating quantity for producing a rotating magnetic field, a member mounted for rotation relative to said means in said magnetic field, said member being responsive to energization by a second alternating quantity for producing in coaction with said rotating magnetic field a force which urges said member towards a correct position dependent on the phase displacement of said alternating quantities, means for deriving from said first alternating quantity an auxiliary alternating quantity, said auxiliary quantity having a phase displacement relative to said first alternating quantity dependent on the position of said member in said rotating magnetic field, and means for applying said auxiliary alternating quantity to said member to expedite actuation of said member towards said correct position.

2. In a device responsive to the phase displacement between two alternating electrical quantities, means effective when energized by a first alternating quantity for producing a rotating magnetic field, a coil, means mounting said coil for rotation relative to said first-named means in said magnetic field, means responsive to a second alternating quantity for rotating the coil towards a position in the magnetic field determined by the phase relationship between the first and second electrical quantities, said coil having a voltage induced therein by said magnetic field which varies in phase relative to said first alternating quantity in accordance with the position of said coil relative to said first-named means, and means controlled by said voltage for supplying auxiliary alternating energy to said coil.

3. In a device responsive to the phase displacement between two alternating electrical quantities, means effective when energized by a first alternating quantity for producing a rotating magnetic field, a coil, means mounting said coil for rotation relative to said first-named means in said magnetic field, means responsive to a second alternating quantity for rotating the coil towards a position in the magnetic field determined by the phase relationship between the first and second electrical quantities, said coil having a voltage induced therein by said magnetic field which varies in phase relative to said first alternating quantity in accordance with the position of said coil relative to said first-named means, means controlled by said voltage for supplying auxiliary alternating energy to said coil, and means for adjusting the phase relationship between said auxiliary alternating energy and said first alternating quantity.

4. In a device responsive to the phase displacement between two alternating electrical quantities, means effective when energized by a first alternating quantity for producing a rotating magnetic field, a coil, means mounting said coil for rotation relative to said first-named means in said magnetic field, said coil having a voltage induced therein by said magnetic field which varies in phase relative to said first alternating quantity in accordance with the position of said coil relative to said first-named means, means for energizing said coil in accordance with a second alternating quantity, said last-named means comprising means for deriving from said coil an alternating quantity controlled only by said voltage, and means controlled by said last-named alternating quantity for applying to said coil auxiliary energy.

5. In a device responsive to the phase displacement between two alternating electrical quantities, means effective when energized by a first alternating quantity for producing a rotating magnetic field, a coil, means mounting said coil for rotation relative to said first-named means in said magnetic field, said coil having a voltage induced therein by said magnetic field which varies in phase relative to said first alternating quantity in accordance with the position of said coil relative to said first-named means, means for energizing said coil in accordance with a second alternating quantity, said last-named means comprising impedance means associated with said coil for forming therewith a bridge circuit having input terminals and having output terminals, said coil being disposed in an arm of said bridge circuit whereby said voltage appears across said output terminals, and means controlled by the voltage across said output terminals for supplying auxiliary alternating energy to said input terminals.

6. In a device responsive to the phase displacement between two alternating electrical quantities, means effective when energized by a first alternating quantity for producing a rotating magnetic field, a coil, means mounting said coil for rotation relative to said first-named means in said magnetic field, said coil having a voltage induced therein by said magnetic field which varies in phase relative to said first alternating quantity in accordance with the position of said coil relative to said first-named means, means for energizing said coil in accordance with a second alternating quantity, said last-named means comprising impedance means associated with said coil for forming therewith a bridge circuit having input terminals and having output terminals, said coil being disposed in an arm of said bridge circuit whereby said voltage appears across said output terminals, means controlled by the voltage across said output terminals for supplying auxiliary alternating energy to said input terminals, and phase adjusting means for adjusting the phase of said auxiliary alternating energy relative to said first alternating quantity.

7. In a device responsive to the phase displacement between two alternating electrical quantities, means effective when energized by a first alternating quantity for producing a rotating magnetic field, a coil, means mounting said coil for rotation relative to said first-named means in said magnetic field, said coil having a voltage induced therein by said magnetic field which varies in phase relative to said first alternating quantity in accordance with the position of said coil relative to said first-named means, means for energizing said coil in accordance with a second alternating quantity, said last-named means comprising impedance means associated with said coil for forming therewith a bridge circuit having input terminals and having output terminals, said coil being disposed in an arm of said bridge circuit whereby said voltage appears across said output terminals, and means controlled by the voltage across said output terminals for supplying to said input terminals an auxiliary alternating energy which is in phase opposition to the second alternating quantity when said coil is correctly positioned relative to said first-named means in accordance with the phase displacement between said first and second alternating quantities.

8. In a device responsive to the phase displacement between two alternating electrical quantities, means effective when energized by a first alternating quantity for producing a rotating magnetic field, a coil, means mounting said coil for rotation relative to said first-named means in said magnetic field, said coil having a voltage induced therein by said magnetic field which varies in phase relative to said first alternating quantity in accordance with the position of said coil relative to said first-named means, means for energizing said coil in accordance with a second alternating quantity, said last-named means comprising impedance means associated with said coil for forming therewith a bridge circuit having input terminals and having output terminals, said coil being disposed in an arm of said bridge circuit whereby said voltage appears across said output terminals, an amplifier connected between said output and said input terminals for delivering to said input terminals auxiliary alternating energy controlled by said voltage, and means for adjusting the phase relationship between said auxiliary alternating energy and one of said alternating quantities.

9. In a device responsive to the phase displacement between two alternating electrical quantities, means effective when energized by a first alternating quantity for producing a rotating magnetic field, a pair of coils, means mounting said coils for rotation relative to said first-named means in said magnetic field, a first one of said coils having a voltage induced therein by said magnetic field which varies in phase relative to said first alternating quantity in accordance with the position of said first one of said coils relative to said first-named means, means for energizing a second one of said coils in accordance with a second alternating quantity, and means responsive to said voltage for additionally energizing said first one of said coils.

10. In a device responsive to the phase displacement between two alternating electrical quantities, means effective when energized by a first alternating quantity for producing a rotating magnetic field, a pair of coils, means mounting said coils for rotation relative to said first-named means in said magnetic field, a first one of said coils having a voltage induced therein by said magnetic field which varies in phase relative to said first alternating quantity in accordance with the position of said first one of said coils relative to said first-named means, means for energizing a second one of said coils in accordance with a second alternating quantity, and means including an amplifier responsive to said voltage for additionally energizing said first one of said coils, said first one of said coils being adjustable about its axis of rotation relative to said first-named means.

GEORGE W. NAGEL.
MORTIMER A. SCHULTZ.

REFERENCES CITED

The following references are of record in the file of this patent:

UNITED STATES PATENTS

| Number | Name | Date |
| --- | --- | --- |
| 1,073,632 | Robinson | Sept. 23, 1913 |
| 1,318,126 | Angus | Oct. 7, 1919 |
| 1,621,006 | Evans | Mar. 15, 1927 |
| 1,641,693 | Price | Sept. 6, 1927 |
| 2,288,628 | Lee | July 7, 1942 |